May 2, 1972  R. G. LABARGE ET AL  3,660,295

BLEACHING COMPOSITIONS

Filed April 27, 1970

INVENTORS.
Robert G. LaBarge
Donald K. Bradley

BY Griswold & Burdick

ATTORNEYS

United States Patent Office 3,660,295
Patented May 2, 1972

3,660,295
BLEACHING COMPOSITIONS
Robert G. La Barge and Donald K. Bradley, Midland, Mich., assignors to The Dow Chemical Company, Midland, Mich.
Filed Apr. 27, 1970, Ser. No. 32,276
Int. Cl. C11d 7/54
U.S. Cl. 252—104         9 Claims

ABSTRACT OF THE DISCLOSURE

Disclosed herein are liquid bleaching compositions which when dispersed in water provide aqueous solutions having good oxidizing power. The aqueous solutions can be used, for example, to launder clothes. The bleaching compositions comprise an inorganic peroxygen compound dispersed in a carrier liquid. The carrier liquid also has a carboxylic acid anhydride dissolved therein.

BACKGROUND OF THE INVENTION

Figure 1:
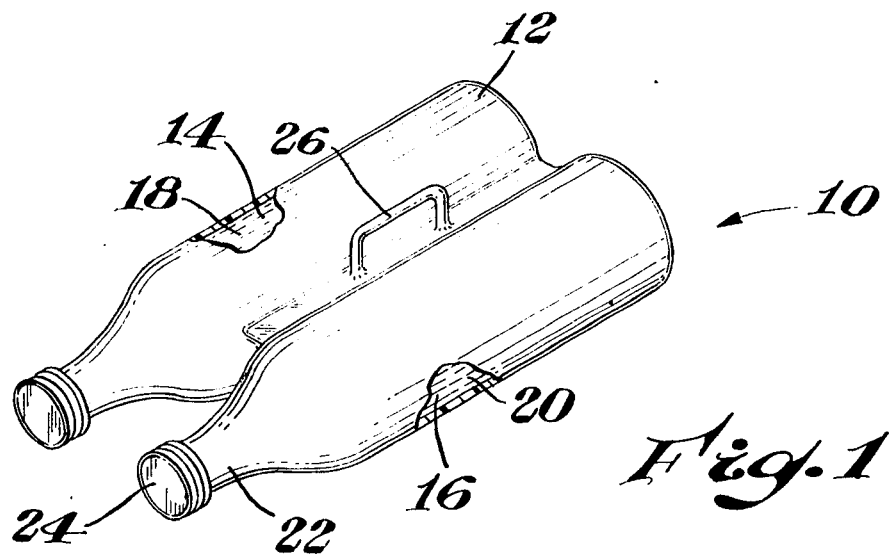
Figure 2:
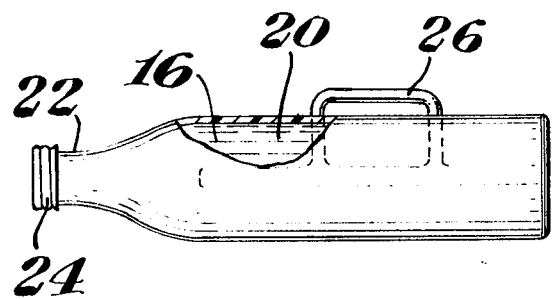

It has long been known that aqueous peroxide solutions, such as those produced by reaction between an organic acid anhydride and an inorganic peroxygen compound, possess valuable oxidizing and bleaching properties. The solutions are useful, for example, in laundering clothes. However, when stored, "dry" compositions containing both the anhydride and peroxygen compound tend to react with one another or with moisture. Therefore (as set forth in MacKellar et al., U.S. Pat. 3,338,839) the anhydride and peroxygen compound should not be contacted with one another in the "dry" state, or alternatively, the anhydride can be coated with a water soluble, or dispersible coating prior to mixing the anhydride with the remaining components of the bleaching mix. It is also known that various preservatives can be added to the dry bleach composition to inhibit premature reaction of the components thereof.

The present invention contemplates combination of the organic anhydride and inorganic peroxygen compound before utilization of the bleaching and oxidizing capabilities of the composition. The invention is based upon the discovery that when dispersed in certain carrier liquids, the anhydride and inorganic peroxygen compounds do not interact appreciably. The dispersion is therefore relatively stable. A particular advantage of the liquid "dispersions" of the invention is that various additives such as optical brighteners and thickening agents can also be admixed in the compositions without impairing the stability thereof.

The drawing depicts a package of bleach composition which is an embodiment of the present invention.

DESCRIPTION OF THE INVENTION

Bleaching compositions of the invention comprise a solid particulate inorganic peroxygen compound dispersed in a solution of a carboxylic acid anhydride in an essentially anhydrous, water-dispersible organic material. By weight, from about 5 to about 40 percent of the composition is the peroxygen compound. Preferably, only 15 to 25 percent by weight is peroxygen compound. About 25 to about 75 weight percent of the solution is the anhydride solute. Preferably, from about 40 to about 60 weight percent is the anhydride solute. In the composition, a sufficient amount of the anhydride is employed so that the molar ratio of the active oxygen component of the peroxygen compound to anhydride is from about 0.5 to about 2. Preferably the ratio is about 1.

Other substances commonly employed in bleaching formulations can be added. These include, for example, anhydrous sodium sulfate, sodium phosphate, optical brighteners, sodium tripolyphosphate and emulsifiers (surfactants). These substances can be soluble or insoluble in the organic solvent.

Acid anhydrides employed in the invention are aliphatic or aromatic and contain from 4 to about 14 carbon atoms. Examples of suitable anhydrides are succinic anhydride, maleic anhydride, phthalic anhydride, glutaric anhydride and benzoic anhydride. Other suitable anhydrides are the "mixed" anhydrides described in U.S. Pat. 3,338,839 and incorporated herein by reference.

In organic peroxygen compounds employed in the present invention are solid particulated compounds (at 25° C.), which hydrolyze in water to form hydrogen peroxide. Additionally, the peroxygen compounds are characterized as containing from about 10 to about 25 percent by weight of "active" oxygen as determined iodometrically. The particle size of the compound is generally uniform and falls within the range of from about 25 to about 200 mesh (U.S. Standard Sieve).

Suitable inorganic peroxygen compounds are, for example, the inorganic perborates and peroxides; hydrated sodium perborate (e.g., the monohydrate) is frequently employed. Potassium perborate and ammonium perborate are also desirable because of their stability for extended periods of time. Other peroxygen compounds which may be employed are zinc peroxide, magnesium peroxide and calcium peroxide. The peroxygen compounds employed may be either anhydrous (e.g., $KBO_3 \cdot \frac{1}{2} H_2O$) or in the hydrated form (e.g., $NaBO_2 \cdot H_2O_2 \cdot 3H_2O$) as long as they are sufficiently free of uncombined water so as to be unreactive toward the organic acid anhydride.

The solvent for the organic anhydride is an organic hydrocarbon containing from 1 to 12 carbon atoms which is essentially non-reactive with the anhydride or with the inorganic peroxygen compound. Suitably non-reactive compounds are also non-acidic in the sense that they do not contain reactive nucleophilic sites such as are present in amines, acids, alcohols, or mercaptans. In addition, the solvents have melting points below about 5° C. and boil at temperatures in excess of about 60° C.

Suitable solvents having the characteristics set forth above include polyhalogenated hydrocarbons having from 1 to 7 carbon atoms; aliphatic hydrocarbons having from 6 to 10 carbon atoms; aromatic hydrocarbons and alkyl-substituted aromatic hydrocarbons containing from 6 to 12 carbon atoms; nitro-substituted aliphatic hydrocarbons having 1 to 5 carbon atoms; and nitro-substituted aromatic hydrocarbons having from 6 to 10 carbon atoms. Suitable solvents include, for example, nitroethane, nitropropanes, benzene, toluene, xylenes, heptanes, octanes, and nitrobenzene.

Preferred polyhalogenated solvents are the polychlorinated hydrocarbons having from 1 to 6 carbon atoms. Specific examples of these compounds include 1,1,1-trichloroethane, carbon tetrachloride, chloroform, o-dichlorobenzene, dichloroethyl ether, 1,2-dichloroethylene, methyl chloroform, perchloroethylene, propylene dichloride and chlorobenzene.

Ketones, esters and ethers containing from about 5 to 55 percent by weight of oxygen are also suitable solvents provided they are liquids over the temperature range of from about 5° C. to about 60° C. Suitable oxygenated solvents generally are selected from the group of aliphatic and aromatic hydrocarbon ethers having from 5 to 12 carbon atoms; dimethyl and diethyl ethers of polyethylene and polypropylene glycols; hydrocarbon esters of aliphatic carboxylic acids containing from 4 to 12 carbon atoms per molecule of the ester; acetic acid esters of polypropylene and polyethylene glycol ethers; and aliphatic ketones containing from 5 to 12 carbon atoms.

Specific examples of suitable oxygenated solvents are n-propyl acetate, 3-pentanone, dipropyl ether, dioxane, dibutyl ether, n-butyl propionate, i-butyl acetate, ethylene glycol ethyl ether, glycol ethers such as ethylene glycol diphenyl ether, ethylene glycol dimethyl ether, ethylene glycol diethyl ether, ethylene glycol di n-butyl ether, diethylene glycol dimethyl ether, diethylene glycol diethyl ether, diethylene glycol di n-butyl ether, propylene glycol dimethyl ether, dipropylene glycol dimethyl ether, tripropylene glycol dimethyl ether, mixtures of diisobutyl ethers of propylene glycol and homologs thereof, methyl propyl ketone and ethyl methyl ketone.

Preferably, the acid anhydride is benzoic anhydride, the inorganic peroxygen compound is potassium perborate, and the solvent is 1,1,1-trichloroethane. The bleaching compositions of the invention are prepared by dissolving the anhydride in the solvent and admixing the particulate peroxygen compound into the solution.

The bleaching formulations of the present invention are employed by dissolving them in water. Detergents, water softeners, etc., can be added to the aqueous solution of bleach.

When laundering clothes, good results will be obtained if the temperature of the aqueous bleach bath is from about 100° F., to about 160° F., with temperatures of from about 120° F., to about 140° F., being quite feasible. The latter temperature range can easily be provided by commonly-employed hot water heaters. The pH of the aqueous bleach bath should be regulated at from about 7 to about 10, with optimum results being obtained at pH levels of from about 8.0 to about 8.5. Regulation of pH is easily accomplished by incorporating a buffering composition into the bleach formulation. Suitable buffer compositions include, for example, trisodium phosphate, ammonium sulfite, sodium sulfate anhydride and sodium tripolyphosphate.

Bleaching baths prepared with formulations of the present invention are generally characterized as containing from about 5 to about 150 parts per million (p.p.m.) of "active" oxygen.

For purposes of the present invention, "active" oxygen is determined by admixing about 10 ml. of the bleach solution (heated sufficiently to conform with the normal use procedures described above) to be measured, with 50 ml. of deionized water and 25 ml. of 20% sulphuric acid. About one gram of potassium iodide crystals are added to the mixture along with several drops of a 5% (by weight) solution of ammonium molybdate, as catalyst. The resulting mixture is titrated with 0.01 normal sodium thiosulfite solution. The active oxygen content as weight percent of the solution is computed by the following formula:

$$\text{Active oxygen} = \frac{N \times \text{ml.} \times O_2 \text{ factor}}{\text{Amount of sample}}$$

where N is the normality of the sodium thiosulfite; ml. is the volume of sodium thiosulfite employed; and $O_2$ factor is a constant equal to 0.08. The active oxygen content in weight percent can be converted to parts per million if desired.

With liquid bleaching compositions such as those described above, it is possible to blend various particulate thickening agents into the composition without causing detrimental reactions between the components thereof. Such thickening agents are generally employed where it is desired to reduce "settling out" of components of the bleaching composition. An embodiment of the invention, therefore, is a pourable thickened bleaching composition comprising by weight from about 0.1 to about 5.0 percent of a thickening agent. Preferably, from about 2.0 to about 3.0 percent by weight of the composition is a thickening agent. The other components of the thickened composition and the amounts thereof are the same as for the "non-thickened" systems described herein above.

Thickening agents employed are particulate substances having a generally uniform particle size of from about 0.01 micron $\mu$ to about 10$\mu$, and preferably from about 0.015$\mu$ to about 2$\mu$. The viscosity of the thickened bleach is in excess of about 500,000 centipoises and is usually from about 1,000,000 to about 1,500,000 centipoises. Suitable particulate thickening agents are, for example, fumed silicas, expanded clays (e.g., attapulgites), polyacrylates, and substituted mineral clays.

For effective thickening action, the particles are approximately uniformly distributed throughout the thickened bleaching composition. In preparing the thickened composition, the particles (discontinuous phase) are blended into liquid (continuous phase) by means of a low speed rotary blender or other comparable blending means generating low shearing forces. High speed blenders with sharp blades tend to generate large shearing forces and should be avoided.

The bleaching compositions described above are generally prepared as a suspension of solid particulate peroxygen compound dispersed in a liquid carrier. The resulting composition is packaged in a single container. It may be desirable, however, to prepare and separately package the components of the bleach with mixing occurring only when the bleach bath is formed. An embodiment, therefore, of the present invention is a multi-chambered package of bleaching composition comprising a first chamber containing a solution of organic carboxylic acid anhydride. A second chamber of the package contains the inorganic peroxygen compound, either in solid form or as an aqueous solution. In use, the separately-housed components are poured from the package and mixed in the presence of sufficient water to form a bleaching bath of the desired strength.

Where the inorganic peroxygen compound is present in the container as a solid compound, a reaction will take place in the washing medium to produce hydrogen peroxide. A sufficient amount of inorganic peroxygen compound is employed so that the concentration of $H_2O_2$ is from about 0.1 to about 12 percent by weight. If desired, the solution of inorganic peroxygen compound can also be replaced with an aqueous solution of $H_2O_2$ (0.1 to 8 percent by weight).

With reference to the drawing, the package of bleaching composition (indicated by reference numeral 10) comprises a multi-chambered vessel or container consisting of a housing 12 defining a first chamber 14 and a second chamber 16. Disposed in the first chamber 14 is a solution 18 of an organic carboxylic anhydride in one of the solvents described herein above. Disposed in second chamber 16 is an inorganic peroxygen compound or an aqueous solution of hydrogen peroxide. In the embodiment of the invention depicted in the drawing, the second chamber 16 contains an aqueous solution (0.1 to 8 percent by weight) of hydrogen peroxide 20.

Each chamber has a mouth 22. The mouths 22 are fitted with a removable sealing means 24 such as a screw-on cap. The package 10 can also be fitted with a handle 26 for lifting and carrying the package about. Frequently, it is also desirable that the container be fitted with an opaque coating to serve as a light barrier. To form a bleaching bath, the caps 24 are removed and portions of the solutions 18 and 20 are poured (either simultaneously or successively) into water.

The container portion of the package is constructed of acid resistant materials which are generally unreactive with anhydrides or peroxides. Suitable materials are, for example, polyethylene, polyvinylchloride and other plastics.

The following examples are set forth to illustrate the invention.

EXAMPLE 1

A liquid bleaching composition is prepared by dissolving 31 grams of benzoic anhydride in 12 grams of 1,1,1-trichloroethane as solvent. 13.2 grams of sodium perborate monohydrate are blended into the anhydride solution to form a liquid bleaching composition of the present invention.

The composition is stored in a sealed polyethylene container for four weeks at a temperature of about 70° F. Subsequently, 2 grams of the composition are dissolved in 1,000 grams of water. The temperature of the water is 160° F. The resulting aqueous bleaching bath is used to bleach swatches of muslin cloth measuring 4 inches on a side. As a comparison, similarly sized swatches of the cloth are bleached with an aqueous solution of sodium hypochlorite (5.25 percent NaOCl by weight) corresponding closely to chlorine bleaches commercially available.

The test procedure involves agitating the swatches in the aqueous oxygen-type bleaching bath and the chlorine bleach bath. The swatches are allowed to remain in the bleach baths for 10 minutes during which time the temperature of the baths are maintained at about 160° F. At the end of 10 minutes time, the swatches are removed from the bleach bath and are rinsed with fresh water for 5 minutes. The temperature of the rinse water is about 160° F. Upon completion of the rinse cycle, the swatches are ironed dry and "whiteness" readings are taken.

The whiteness of the cloth is determined by measuring blue and luminous (green) reflectance on a D40 type reflectometer manufactured by the Hunter Company. These values are inserted in the following formula:

$$W = G - 4(G - B)$$

where W stands for white reflectance, B for blue reflectance as measured and G for luminous or green reflectance as measured. The whiteness reading for the muslin swatches subjected to the oxygen bleaching composition of the invention is from 62 to 74 units and compares favorably with the chlorine bleached swatches which exhibit a whiteness of 65 to 75 units.

EXAMPLE 2

A thickened bleaching composition is prepared by dissolving 31 grams of benzoic anhydride in 12 grams of dichloromethane. To this solution is added 15 grams of particulate (~150 mesh, U.S. Standard Sieve) sodium borate monohydrate. Two grams of a fused silica particulate thickening agent (about 0.03 micron) are blended into the mixture of perborate, solvent and anhydride. The resulting thickened bleaching composition has a paste-like consistency. When dissolved in water heated to 140° F. or higher, the resulting bleach bath exhibits bleaching action comparable to chlorine bleaches commercially available, i.e., the whiteness rating of muslin cloth as in Example 1 with a bleaching bath formed from the thickened bleaching composition is at least 60 units and is generally from 65 to 75 units.

What is claimed is:

1. A composition which when dispersed in an aqueous solution provides an effective bleaching and oxidizing solution consisting essentially from about 5 to about 40 percent by weight of a solid particulate inorganic peroxygen bleaching agent hydrolyzable in water to form hydrogen peroxide dispersed in a solution of from about 25 to about 75 percent by weight of a carboxylic anhydride activator for said peroxygen compound in a water-dispersible hydrocarbon-derived organic solvent for said anhydride containing from 1 to 12 carbon atoms, with the molar ratio of the active oxygen component of the peroxygen compound to anhydride being from about 0.5 to about 2, said solvent being characterized as a liquid at temperatures of from about 5° C. to about 60° C., and as being essentially non-acidic in that nucleophilic sites reactive with organic anhydride are absent from the solvent, and essentially non-reactive with said anhydride and peroxygen compound.

2. A composition as in claim 1 wherein the solvent is selected from the class of polyhalogenated hydrocarbons having from 1 to 7 carbon atoms; hydrocarbons having from 7 to 10 carbon atoms; aromatic hydrocarbons and alkyl-substituted aromatic hydrocarbons containing from 6 to 12 carbon atoms; nitro-substituted hydrocarbons having from 1 to 5 carbon atoms; nitro-substituted aromatic hydrocarbons having from 6 to 10 carbon atoms and ketones, esters and ethers containing from about 5 to about 55 percent by weight of oxygen.

3. A composition as in claim 1 wherein the solvent is selected from the group hydrocarbon esters of carboxylic acids containing from 4 to 12 carbon atoms; acetic acid esters of polypropylene glycol ethers and polyethylene glycol ethers; and ketones containing from 5 to 12 carbon atoms.

4. A composition as in claim 2 wherein the solvent is a polychlorinated hydrocarbon having from 1 to 6 carbon atoms.

5. A composition as in claim 1 wherein the acid anhydride contains from 4 to 14 carbon atoms.

6. A composition as in claim 1 wherein the molar ratio of the active oxygen component of the peroxygen compound to the moles of anhydride present is about 1.

7. A composition as in claim 1 wherein the inorganic peroxygen compound is hydrated sodium perborate, potassium perborate or ammonium perborate.

8. A composition as in claim 7 wherein the inorganic peroxygen compound is potassium perborate, the solvent is 1,1,1-trichloroethane, and the anhydride is benzoic anhydride.

9. A composition as in claim 1 and including from about 0.1 to about 5.0 percent by weight of a particulate thickening agent which reduces the rate of settling of solid particles in the composition.

References Cited

UNITED STATES PATENTS 3,338,839    8/1967    MacKellar _____ 252—186

MAYER WEINBLATT, Primary Examiner

U.S. Cl. X.R.

8—101; 252—186